United States Patent
Caballero-McCann et al.

(10) Patent No.: US 7,899,175 B2
(45) Date of Patent: Mar. 1, 2011

(54) SYSTEM AND METHOD FOR PROVIDING A DIAL PLAN CONVERSION IN A SESSION INITIATION PROTOCOL (SIP) ENVIRONMENT

(75) Inventors: Denise G. Caballero-McCann, Raleigh, NC (US); William M. Hudson, Jr., Cary, NC (US); Stephen Levy, Cary, NC (US); Daniel P. Linton, Apex, NC (US); Carleton M. Luck, Jr., Apex, NC (US); Louis L. Pratt, Holly Springs, NC (US); Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 1145 days.

(21) Appl. No.: 11/046,005

(22) Filed: Jan. 27, 2005

(65) Prior Publication Data

US 2006/0177039 A1    Aug. 10, 2006

(51) Int. Cl.
*H04M 7/00* (2006.01)
(52) U.S. Cl. ............... 379/221.13; 379/221.14; 370/352
(58) Field of Classification Search ............. 379/221.13; 370/352
See application file for complete search history.

(56) References Cited

U.S. PATENT DOCUMENTS

| | | | | |
|---|---|---|---|---|
| 3,963,874 | A | | 6/1976 | Pommerening et al. ........ 179/18 |
| 4,809,321 | A | | 2/1989 | Morganstein et al. ........ 379/211 |
| 6,192,118 | B1 | * | 2/2001 | Bayless et al. ........... 379/201.01 |
| 6,275,574 | B1 | * | 8/2001 | Oran ........................ 379/201.01 |
| 6,351,526 | B1 | * | 2/2002 | Shaffer et al. ............ 379/201.01 |
| 6,501,750 | B1 | | 12/2002 | Shaffer et al. ................. 370/353 |
| 6,510,162 | B1 | | 1/2003 | Fijolek et al. ................. 370/432 |
| 6,546,087 | B2 | | 4/2003 | Shaffer et al. ............... 379/90.01 |
| 6,567,505 | B1 | | 5/2003 | Omori et al. ..................... 379/84 |
| 6,601,099 | B1 | | 7/2003 | Corneliussen ............... 709/224 |
| 6,614,899 | B1 | | 9/2003 | Sollee et al. ............. 379/218.01 |
| 6,615,236 | B2 | | 9/2003 | Donovan et al. ............. 709/203 |
| 6,625,141 | B1 | | 9/2003 | Glitho et al. ................. 370/352 |
| 6,636,594 | B1 | | 10/2003 | Oran ........................ 379/201.01 |
| 6,658,095 | B1 | | 12/2003 | Yoakum et al. ............ 379/93.01 |
| 6,661,799 | B1 | | 12/2003 | Molitor ........................ 370/401 |
| 6,665,723 | B2 | * | 12/2003 | Trossen ........................ 709/227 |
| 6,678,265 | B1 | | 1/2004 | Kung et al. ................... 370/352 |
| 6,678,735 | B1 | | 1/2004 | Orton et al. ................... 709/230 |
| 6,684,147 | B2 | | 1/2004 | Park et al. ........................ 701/71 |
| 6,731,625 | B1 | | 5/2004 | Eastep et al. ................. 370/352 |
| 6,731,630 | B1 | * | 5/2004 | Schuster et al. .............. 370/356 |

(Continued)

OTHER PUBLICATIONS

H. Schulzrinne and C. Agboh, "Session Initiation Protocol (SIP)-H. 323 Interworking Requirements," RFC 4123, 15 pages, Jul. 2005.

(Continued)

*Primary Examiner* — Fan Tsang
*Assistant Examiner* — Ibraham Sharifzada
(74) *Attorney, Agent, or Firm* — Baker Botts L.L.P.

(57) ABSTRACT

A method to be executed in a session initiation protocol (SIP) environment is provided that includes initiating a conversion process that involves a change from a first communications platform to a second communications platform. One or more routing tables associated with the first communications platform are then dumped. A conversion script is executed such that one or more patterns associated with a dial plan corresponding to the second communications platform are provided in a dial plan format. One or more files associated with the dial plan are loaded into one or more endpoints that are designated to change to the second communications platform.

18 Claims, 3 Drawing Sheets

U.S. PATENT DOCUMENTS

| | | | |
|---|---|---|---|
| 6,738,390 B1 | 5/2004 | Xu et al. | 370/467 |
| 6,754,181 B1 | 6/2004 | Elliott et al. | 370/252 |
| 6,760,322 B1 | 7/2004 | Fukuda et al. | 370/352 |
| 6,785,246 B2 | 8/2004 | Foti | 370/261 |
| 6,788,676 B2 | 9/2004 | Partanen et al. | 370/352 |
| 2004/0205241 A1* | 10/2004 | Aarnos et al. | 709/245 |
| 2005/0141491 A1* | 6/2005 | Low et al. | 370/352 |
| 2006/0007954 A1 | 1/2006 | Agrawal et al. | 370/466 |
| 2009/0092129 A1* | 4/2009 | Pearce | 370/352 |

OTHER PUBLICATIONS

J. Rosenberg and H. Schulzrinne, "An Offer/Answer Model with the Session Description Protocol (SDP)," RFC 3264, 24 pages, Jun. 2002.

J. Rosenberg, H. Schulzrinne, and P.Kyzivat, "Caller Preferences for the Session Initiation Protocol (SIP)," RFC 3841, 25 pages, Aug. 2004.

H. Schulzrinne and S. Petrack, "RTP Payload of DTMF Digits, Telephony Tones and Telephony Signals," RFC 2833, 27 pages, May 2000.

A.B. Roach, "Session Initiation Protocol (SIP)-Specific Event Notification," RFC 3265, 34 pages, Jun. 2005.

J. Rosenberg, H. Schulzrinne, G. Camarillo, A. Johnston, J. Peterson, R. Sparks, M. Handley, and E. Schooler, "SIP: Session Initiation Protocol ,"Network Working Group, RFC 3261, 269 pages, Jun. 2002.

R. Mahy, et al., "The Session Initiation Protocol (SIP) 'Join' Header," The Internet Society, RFC 3991, http://www.ietf.org/rfc/rfc3911.txt, 15 pages, Oct. 2004.

R. Mahy, et al., "The Session Initiation Protocol (SIP) 'Replaces' Header," The Internet Society, RFC 3891, http://www.ietf.org/rfc/rfc3891.txt, 15 pages, Sep. 2004.

M. Soroushnejad, et al. "Implementing Bridged Line Appearances (BLA) Using Session Initiation Protocol (SIP)," Internet Draft http://bgp.potaroo.net/ ietf/html/ids/draft-anil-sipping-bla-03.txt, 33 pages, Jun. 15, 2006.

J. Rosenberg et al., "An INVITE Initiated Dialog Event Package for the Session Initiation Protocol (SIP)," RFC 4235, http://ietfreport.isoc.org/idref/draft-ietf-sipping-dialog-package-06.txt, 38 pages, Apr. 12, 2005.

R. Mahy et al., "Remote Call Control in SIP using the REFER method and the session-oriented dialog package," Internet Draft (no longer posted on Internet), The Internet Society, 35 pages, Feb. 2004.

R. Mahy et al., "Remote Call Control in Session Initiation Protocol (SIP) using the REFER method and the session-oriented dialog package," Internet Draft, http://www.ietf.org/internet-drafts/draft-mahy-sip-remote-cc-03.txt, The Internet Society, 14 pages, Mar. 5, 2006.

U.S. Appl. No. 11/045,996, by inventors Denise G. Caballero-McCann et al., entitled "System and Method for Providing a Dial Plan Conversion in a Session Initiation Protocol (SIP) Environment," 40 pages, filed Jan. 27, 2005.

USPTO; *Office Action* dated Nov. 3, 2008 for U.S. Appl. No. 11/045,996, filed Jan. 27, 2005 in the name of Denise G. Caballero-McCann, 12 pages.

USPTO; *Final Office Action* dated Apr. 17, 2009 for U.S. Appl. No. 11/045,996, filed Jan. 27, 2005 in the name of Denise G. Caballero-McCann, 11 pages.

USPTO; *Interview Summary* dated Jun. 10, 2009 for U.S. Appl. No. 11/045,996, filed Jan. 27, 2005 in the name of Denise G. Caballero-McCann, 2 pages.

USPTO; *Office Action* dated Oct. 7, 2009 for U.S. Appl. No. 11/045,996, filed Jan. 27, 2005 in the name of Denise G. Caballero-McCann, 12 pages.

* cited by examiner

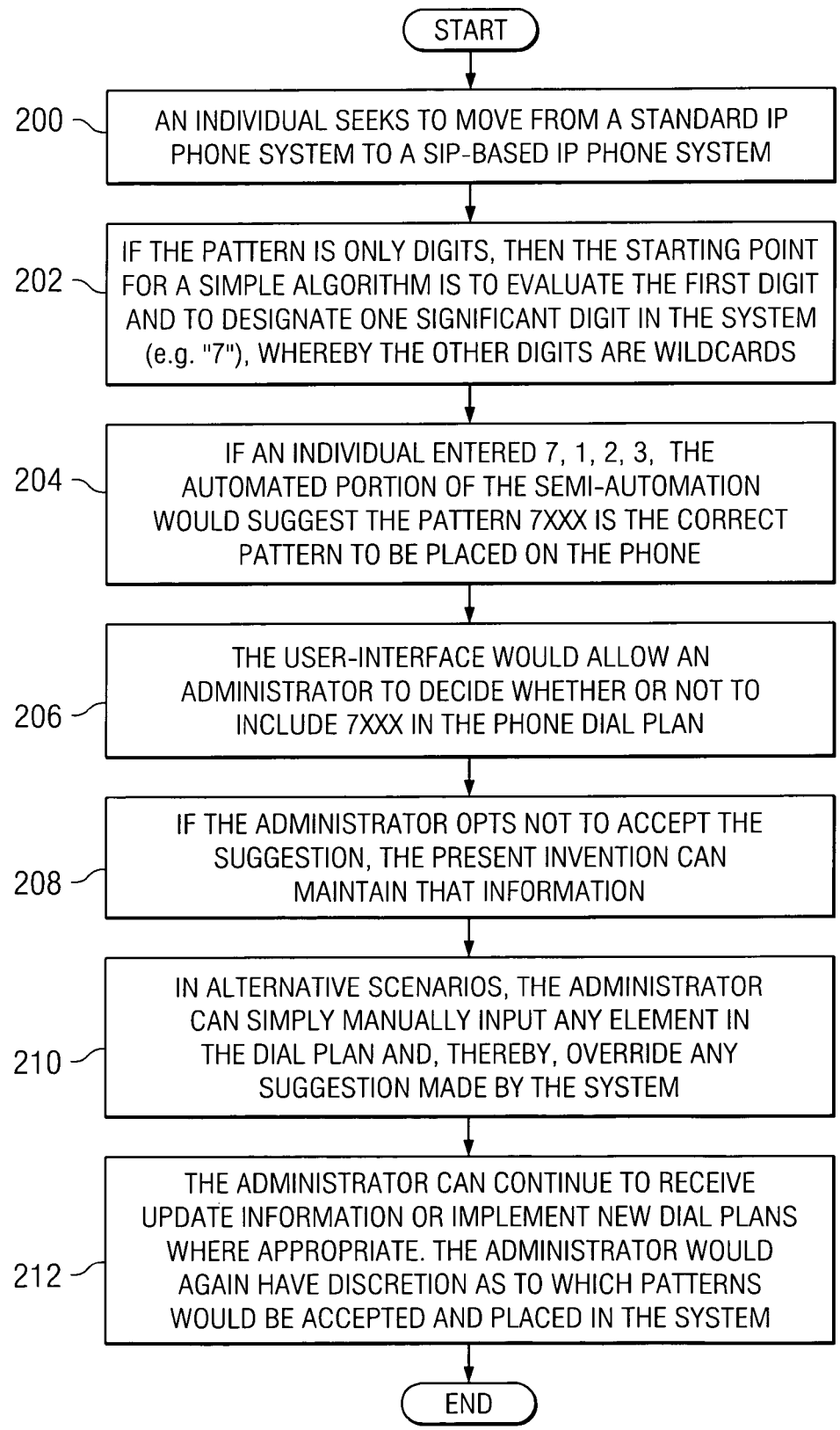

SYSTEM AND METHOD FOR PROVIDING A DIAL PLAN CONVERSION IN A SESSION INITIATION PROTOCOL (SIP) ENVIRONMENT

TECHNICAL FIELD OF THE INVENTION

This invention relates generally to communications and, more particularly, to a system and a method for providing a dial plan conversion feature in a session initiation protocol (SIP) environment.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies that exist in the current marketplace.

As new communication architectures (such as session initiation protocol (SIP), for example) become available to the consumer, new processes need to be developed in order to optimize this emerging technology. For example, one problem often encountered by an administrator is provisioning a dial plan. This provisioning could encompass an update to the existing dial plan, or this could involve an implementation of a new dial plan. Administrators are generally relegated the arduous task of designing, configuring, and delivering the appropriate dial plan. Performance suffers during this process because errors are almost unavoidable, as the human element of this procedure is susceptible to mistakes. Moreover, such operations are time intensive. Accordingly, the issues in delivery, time, and processing presents a burden for any employee, employer, individual, or endpoint that seeks to execute a successful dial plan conversion.

SUMMARY OF THE INVENTION

From the foregoing, it may be appreciated by those skilled in the art that a need has arisen for an improved process that provides an effective solution for administrators that manage a communications architecture. In accordance with an embodiment of the present invention, a system and a method for providing an enhanced dial plan conversion are provided that substantially eliminate or greatly reduce disadvantages and problems associated with conventional communication strategies and protocols.

According to a fully automatic embodiment of the present invention, a method to be executed in a session initiation protocol (SIP) environment is provided that includes initiating a conversion process that involves a change from a first communications platform to a second communications platform. One or more routing tables associated with the first communications platform are then dumped. A conversion script is executed such that one or more patterns associated with a dial plan corresponding to the second communications platform are provided in a dial plan format. One or more files associated with the dial plan are loaded into one or more endpoints that are designated to change to the second communications platform.

According to a semi automatic embodiment of the present invention, a method to be executed in a session initiation protocol (SIP) environment is provided that includes initiating a conversion process that involves a change from a first communications platform to a second communications platform. A first digit of a pattern associated with a dial plan that is to be used in the second communications platform may be evaluated. A designation for one significant digit of the pattern is then executed. An election to include a suggested pattern in the dial plan associated with the second communications platform may then be accepted.

Certain embodiments of the present invention may provide a number of technical advantages. For example, according to one embodiment of the present invention, an architecture and a process are provided that avoid time-consuming endeavors that tax an administrator during the conversion process. Further, the administrator does not need to learn the XML syntax, as the conversion utility will handle the syntax correctly. A one-to-one mapping of each entry exists in the database of the communications platform (e.g. a Call Manager platform) for the resulting XML dial plan entry. The human element of possibly missing an entry is effectively removed by the present invention.

Another technical advantage associated with one embodiment of the present invention relates to efficiency. Typically, a dial plan is optimized over time. Having an automated approach allows for the centralized knowledge, which is built into the database, to be fully utilized in a consistent manner when creating the distributed dial maps for the SIP endpoints. Moreover, allowing for a distributed model has the advantage for the endpoint of not relying on an external source to determine how to dial. Hence, the endpoint can behave consistently in normal operating, failover/redundant, and wireless local access network (WLAN)-outage environments. In addition, such an architecture can readily be extended to legacy scenarios involving an upgrade in system functionalities. The present invention provides exceptional flexibility in its applications.

Certain embodiments of the present invention may enjoy some, all, or none of these advantages. Other technical advantages may be readily apparent to one skilled in the art from the following figures, description, and claims.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which:

FIG. 3 is a simplified flowchart of an example operational flow associated with a semi automatic implementation of the communication system of FIG. 1.

DETAILED DESCRIPTION OF THE INVENTION

Figure 1:
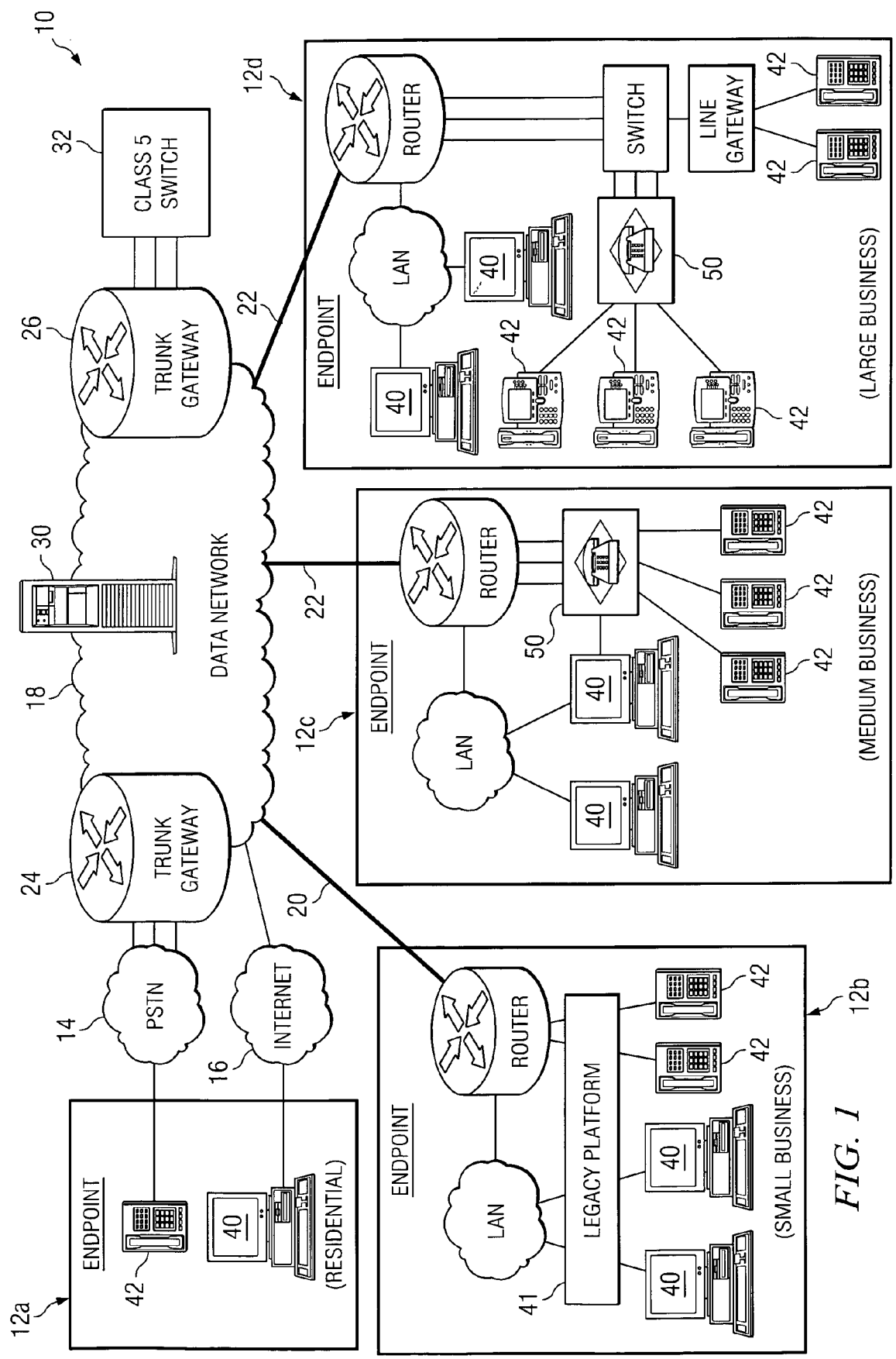
FIG. 1 is a simplified block diagram illustrating a communication system that may implement an enhanced dial plan conversion feature in accordance with one embodiment of the present invention.

FIG. 1 is a simplified block diagram of a communication system 10 for communicating, receiving, and transmitting data in a session initiation protocol (SIP) environment. Communication system 10 includes endpoints 12a-12d, a public switched telephone network (PSTN) 14, an Internet 16, a data network 18, a broadband access link 20, and a number of additional links 22 (which may include, for example, a digital subscriber line (DSL) link, a T1 link, a fiber optic link, and a wireless link). Communication system 10 also includes a set of trunk gateways 24 and 26, a 3rd-party application server 30, and a Class-5 switch 32.

Endpoint 12a represents a residential location, which consists of a computer 40 and several telephones 42. Telephones 42 may be an Internet protocol (IP) telephone or a standard telephone that is operable to interface with computer 40 such that one or more capabilities of SIP are enabled through telephone 42. Accordingly, two types of telephones are illustrated in FIG. 1. Endpoint 12b represents a small business entity, which consists of a local area network (LAN), a router, several computers 40, and several telephones 42. In addition, endpoint 12b may include a legacy platform 41, which is operable to communicate with each telephone 42 and/or computer 40.

Endpoint 12c represents a medium business entity, which consists of a LAN, router, a private branch exchange (PBX) or key system, several computers 40, and several telephones 42. Endpoint 12d is a large business entity, which consists of a LAN, a router, a switch, a line gateway, several computers 40, and several telephones 42. Note also that FIG. 1 includes a legacy architecture (endpoint 12b) that, as explained more fully below, seeks to upgrade to a SIP platform. Such a conversion scenario could readily benefit from the teachings of the present invention. Note also that endpoints 12c and 12d each include a communications platform 50, which is operable to communicate with any number of devices (e.g. telephones 42 and/or computer 40). In one embodiment, communications platform 50 is a Call Manager element, which is manufactured by Cisco Systems, Inc. of San Jose, Calif. The Call Manager element is SIP-enabled, as it has already undergone the conversion process, whereby the legacy architecture of endpoint 12b is the object that seeks to execute a successful dial plan conversion. In other embodiments, communications platform 50 is any suitable unit that is operable to interface with end-user devices (e.g. telephone 42, computer 40, etc.).

In accordance with the teachings of the present invention, communication system 10 offers an automated (inclusive of semi and fully automatic implementations) dial conversion plan for a given architecture that saves considerable effort and time expended by an administrator. As an initial matter, an administrator can create an effective call or dial plan. An algorithm (e.g. provided in software) can deterministically provide this information in a repeatable format, which is correct in its syntax. Using such a process, a substantial number of errors are effectively avoided when the dial plan is pushed down to (or provisioned among) the endpoints (i.e. the end-user devices that will utilize the dial plan). This could be done, for example, during a transformation from a standard Call Manager platform (provided in any of the endpoints of FIG. 1) to a SIP-enabled architecture. Alternatively, any other suitable platform may be updated, upgraded, or replaced entirely with the SIP platform and, hence, benefit from the extensive teachings of the present invention.

Note that dialing and digit collection are generally problematic in certain communication systems (e.g. those that involve peer-to-peer protocols). In addition, because SIP is a text-based protocol, parsing is also a consideration. Administrators are generally burdened by the time-consuming chore of creating, configuring, and delivering a proper dial plan to corresponding endpoints. Errors are ubiquitous because of the human element in this endeavor. Communication system 10 addresses this deficiency, and others, in offering an effective automation of these demanding and lengthy tasks. In essence, a number of human responsibilities are eliminated by software, which can successfully perform these tasks with minimal required action from the administrator.

Communication system 10 can leverage the technology in the routing database and the SIP XML-based dial plan. Communication system 10 utilizes an intelligent algorithm to push the centralized digit analysis knowledge out into the network, which enables an efficiency in digit collection and performance. At least one advantage lies in the cost savings of the manual steps, which are usually needed to create a distributed dial-map while maintaining the balance between the centralized pattern analyses.

Other advantages may relate to providing a consistent method for transitioning from digit analysis patterns to SIP XML-based dial plan entries. An administrator-does not need to learn the XML syntax, as the conversion utility addresses the syntax correctly. There is a specific one-to-one mapping from each database entry to the corresponding XML entry. This removes the human element in possibly missing an entry.

Another advantage of having an automated approach is that it allows for the centralized knowledge, which is included in the database, to be fully utilized in a consistent manner when creating the distributed dial maps for the SIP endpoints. Also, allowing for a distributed model has the advantage for the endpoint of not relying on an external source to determine how to dial. A given endpoint will behave consistently in normal operating conditions, as well as perform successfully in failover/redundant and outage environments.

It should be noted that the transition from a first communications platform to a second communications platform within communications system 10 includes a scenario in which the first communications platform is being upgraded (i.e. to a second communications platform). For example, a non-SIP enabled communications platform (the first communications platform) may be upgraded in order to be SIP-compatible (the second communications platform). Such an upgrade or transition is clearly within the broad scope of the present invention.

Note that there are two distinct embodiments of the present invention. The first involves a fully automatic implementation (detailed in the flowchart of FIG. 2) and the second involves a semi automatic implementation (detailed in the flowchart of FIG. 3). For example, an administrator can use a fully automatic approach initially, but then seek to use the semi automatic approach for updates. Alternatively, the administrator can initially begin to use a fully automatic approach, but then opt to manually key-in several preferred dial plan entries. Hence, these two embodiments (fully and semi automatic) can be suitably integrated together in any appropriate fashion based on particular needs.

The semi automatic implementation may be thought of a proverbial "must have" solution for any given administrator who is transitioning between two platforms. The fully automatic implementation further addresses issues of scalability for the network. In order to further explain and detail these operations and others, a number of additional examples are provided herein in this document and discussed below with reference to FIGS. 2-3.

Endpoints 12a-d are SIP-compatible elements that include hardware and/or software that is operable to receive and to transmit data (directly or indirectly) and to implement the enhanced dial plan conversion feature as outlined herein. In one embodiment, the conversion or update procedure is initiated by an administrator who can control legacy platform 41. Once the conversion process has been completed, legacy platform 41 will be SIP-enabled.

Note that the term "endpoint" encompasses a myriad of potential devices and infrastructure that may benefit from the operations of communication system 10. Endpoints 12a-d may be a personal digital assistant (PDA), a cellular telephone, a standard telephone (which may be coupled to a personal computer) an IP telephone, a personal computer, a laptop computer, a mobile telephone, or any other suitable device or element (or any appropriate combination of these elements) that is operable to receive data or information. Each endpoint may also include suitable network equipment and appropriate infrastructure (e.g., switches, routers, LANs, gateways, etc.) to facilitate a SIP session. FIG. 1 illustrates only one set of example devices that may be used within communication system 10. The present invention is replete with numerous alternatives that could be used to facilitate the operations of communication system 10.

It should also be noted that the internal structure of endpoints 12a-d are malleable and can be readily changed, modified, rearranged, or reconfigured in order to achieve their intended operations as they pertain to the dial plan conversion function. As identified supra, software and/or hardware may reside in endpoints 12a-d in order to achieve the teachings of the enhanced dial plan conversion feature of the present invention. Specifically, such items may be included in (or loaded into) any targeted communications platform (e.g. legacy platform 41) and/or telephones 42 (and/or computers 40). This includes any usage of appropriate algorithms for executing digit analysis, identifying ambiguous patterns, recognizing overlap conditions, prompting an administrator, receiving manual inputs, etc. However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of the elements included within endpoints 12a-d in the context of communication system 10 and, accordingly, it should be construed as such.

For purposes of teaching and discussion, it is useful to provide some overview as to the way in which the following invention operates in a SIP environment. The following foundational information may be viewed as a basis from which the present invention may be properly explained. Such information is offered earnestly for purposes of explanation only and, accordingly, should not be construed in any way to limit the broad scope of the present invention and its potential applications.

SIP is an application-layer control protocol that can establish, modify, and terminate multimedia sessions (conferences) such as Internet telephony calls. SIP can also invite participants to already existing sessions, such as multicast conferences. Media can be added to (and removed from) an existing session. SIP transparently supports name mapping and redirection services, which supports personal mobility. End users can maintain a single externally visible identifier regardless of their network location.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both called and calling party locations; and 5) session management: including transfer and termination of sessions, modifying session parameters, and invoking services.

A standard SIP platform does not provide services. Rather, SIP provides primitives that can be used to implement different services. For example, SIP can locate a user and deliver an opaque object to his current location. If this primitive is used to deliver a session description written in SDP, for instance, the endpoints can agree on the parameters of a session.

Many IP phone systems use a centralized database format to achieve their routing techniques for IP phone calls. Pattern analysis may be executed as each digit is dialed; this is generally done from a single centralized location for all endpoints. The SIP phone endpoints routinely use a different XML-based dial map for collecting digits for their IP phone calls. The key difference with the SIP endpoint digit collection is that it is distributed and, thus, can allow for more flexibility from the endpoint: while utilizing the information from the centralized call control system. The SIP endpoint can collect digits and have greater UI flexibility prior to interacting with the centralized pattern analysis database.

As SIP gains notoriety within the communications industry, it has become apparent that some architectures may be transitioned to SIP. Moving from, for example, a Call Manager system to a SIP-based system normally requires a manual translation of the Call Manager digit analysis information to the XML-based SIP digit collection format. However, by using an intelligent algorithm, the centralized digit analysis knowledge can be pushed out into the network and allow for an efficiency in digit collection and performance.

As detailed more fully below, communication system 10 offers a new automatic (both fully and semi) conversion of the centralized digit analysis information to a distributed SIP endpoint XML-based digit collection format. This eliminates the difficult task for the administrator of manually translating the digit analysis information into a logical XML-based digit collection map for use with the SIP-based endpoints.

During a typical digit analysis, consider a case where an individual inputs a pattern (e.g. 9+a seven-digit number). From a phone perspective, for any phone that registers with the communications platform (e.g. Call Manager or any other communications platform), every line or extension to be dialed by the system is treated as a separate pattern. When the phone begins dialing, a digit-by-digit comparison or analysis is executed for each digit that is dialed by the phone.

Communication system 10 can push that analysis piece out to an endpoint and, further, create a specific dial plan for the phone itself. Communication system 10 can summarize the patterns that exist on the Call Manager (or other communications platform), which could include thousands of patterns, as each phone that is registered is a separate pattern. Hence, these patterns can be automatically summarized such that they are now represented as a usable dial plan. This allows a given endpoint to avoid executing a cumbersome and lethargic digit analysis with the Call Manager.

Consider another example in which a pattern of 1, 2, 3, 4, 5 is present. A dial plan could be established such that internal extensions are provided as 1XXXX. The plan could be automated such that every one+four (1+4) digit pattern can be summarized into a 1XXXX pattern. Note that current SIP phones have formatting for a dial plan, and some communications platforms (e.g. the Call Manager) already include capabilities for digit analysis. From a phone perspective, if the end user seeks to dial the digit 1, that communication is not a message to the Call Manager to begin a digit-by-digit analysis. Instead, the phone can collect all the digits on the phone and match all of the digits to a particular dial template from the dial plan. The phone can then send a complete en bloc dial stream to the Call Manager. Hence, a performance gain is achieved from a phone perspective because the digit collection has been pushed out to the phone, in contrast to providing separate messages for each digit dial to the Call Manager.

From the semi automatic perspective, which is described in greater detail below, when an administrator provisions patterns in the system, numerous pop-up reminders could be provided that query the administrator if he/she would like to add a given pattern to a dial plan. If the administrator indicates that he/she would like to add the pattern, a second query would ask which type of grouping this pattern should be added to. Thus, a human element is present in the pattern-entry phase in order to create a plan. This is in contrast to an administrator having to provision all the patterns and then summarize those patterns. Note that an example that fully illustrates the semi automatic scenario is provided below with reference to FIG. 3.

In a fully automatic scenario, all the patterns are provisioned (e.g. by an administrator) in the system. These patterns are then deterministically summarized into a set of patterns that can be delivered to the phone such that digit collection is executed at the phone. Digit collection is not being provided in the communications platform (e.g. the Call Manager), although digit analysis can be performed in the communications platform. Hence, from the fully automatic arrangement, provisioned patterns are summarized into a defined set of digit templates and that information is extended to the phone.

Figure 2:
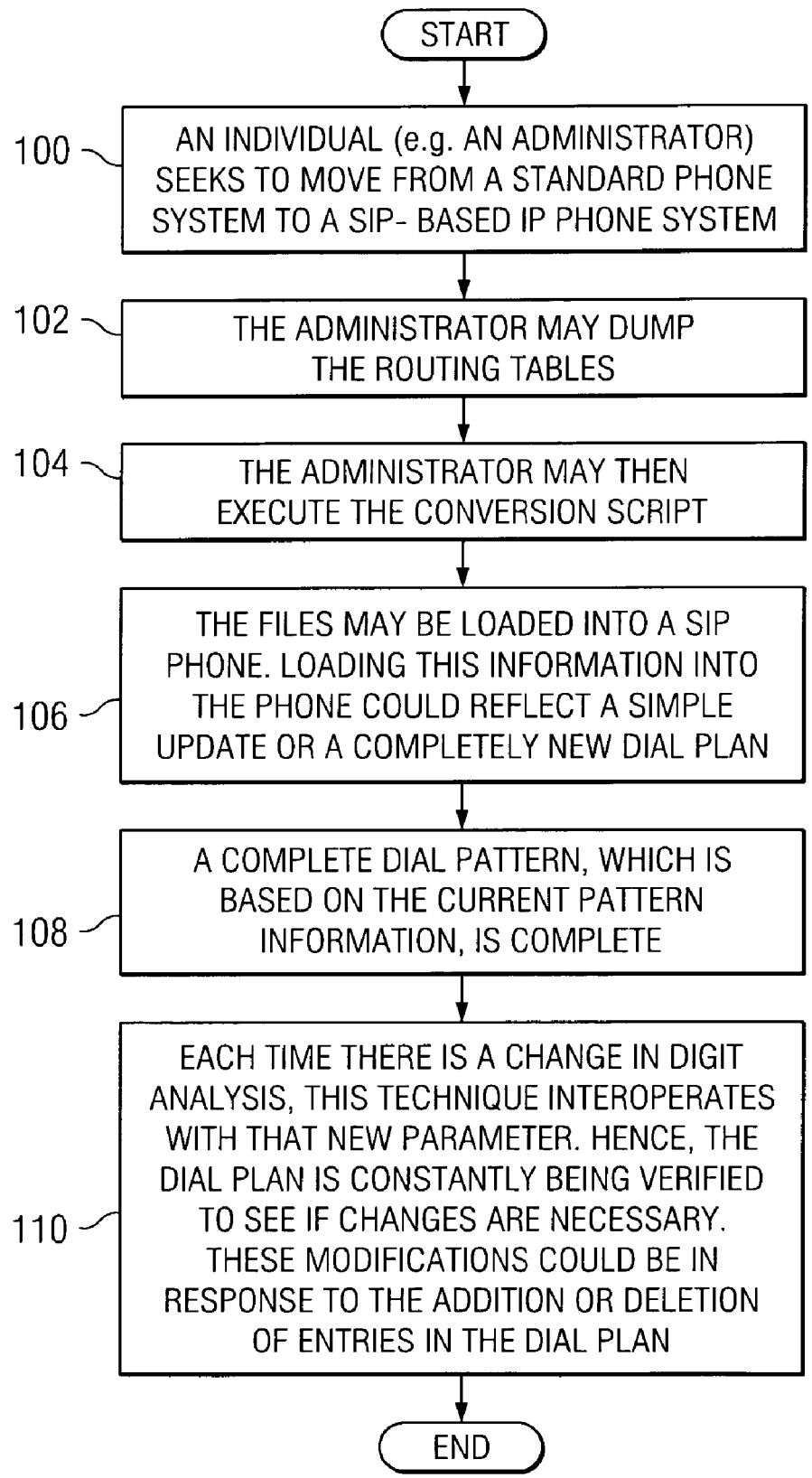
FIG. 2 is a simplified flowchart of an example operational flow associated with a fully automatic implementation of the communication system of FIG. 1.

Turning to an operation of an example embodiment associated with a fully automatic process, which is represented by FIG. 2, consider a case where an individual seeks to move from a standard IP phone system to a SIP-based IP phone system (e.g. from legacy platform 41 to communications platform 50). This is illustrated by step 100. (Note that while the Call Manager is described throughout this document for purposes of illustration and teaching, any suitable communications platform could readily benefit from the broad teachings of the present invention. The Call Manager has only been offered for purposes of example and, accordingly should be construed as such.)

Referring back to the identified example process, the process or procedure may begin where an administrator must dump, examine, and convert the Call Manager routing database (a routing database being generally defined as the compilation of digit patterns and pattern groupings for items like E911, enterprise dialing, 9xx blocking, etc.) into a SIP XML-based format. This can be a time-consuming effort. The administrator must follow the following steps to complete the translation: 1) dump (i.e. suitably position/process) the Call Manager routing tables; 2) physically examine the tables for common groupings; 3) learn the XML syntax language; 4) create the XML dial plan file; and 5) load the file into a SIP phone to verify that the syntax is correct.

Note that in actuality, there is a step '0' in this process, where the administrator creates a number of patterns. There are at least two ways to create these patterns. The first is accomplished by registering through the Call Manager (or through any other communications platform). The second scenario relates to the creation of additional patterns for dialing off-net, local numbers, long distance, etc. Once armed with the database of patterns, the patterns are then placed in a text file (or some other file that is understandable), which is readable such that all the information within the pattern may be readily accessed. This information is then evaluated in order to deterministically identify groups of patterns. In simple dial plans, a particular grouping can be achieved, whereby similar numbers are placed in common groupings for purposes of abbreviation or automation in a given communications architecture.

The SIP dial plan conversion of communication system 10 automatically takes care of steps 2 through 5 for an administrator. Note that step 2 is not as straightforward as a simple mapping. Considerable effort must be expended in the script to account for all the necessary variables.

Referring back to FIG. 2, the administrator may perform the following steps in order to condense the above-outlined procedure. At step 102, the administrator may dump the Call Manager routing tables. At step 104, the administrator may then execute the conversion script. Once this has been completed, the files may be loaded into a SIP phone at step 106. Loading this information into the phone could reflect a simple update or a completely new dial plan installation. In both scenarios, the syntax will be correct. The phones generally have a dial plan format, which could be in XML, for example. Hence, step 104 involves positioning the patterns into an XML format. From this point, a complete dial pattern, which is based on the current pattern information, has been completed. This is illustrated by step 108.

This process greatly reduces the administrator's effort and conversion time when transitioning from an existing communications platform to a new communications platform that includes SIP endpoints. Essentially, this proposed process eliminates much of the human element of the switch over or the upgrade. It should also be noted that this process is dynamic. Each time there is a change in digit analysis, this proposed technique interoperates with that new parameter. Hence, the dial plan is constantly being verified to see if changes are necessary. These modifications could be in response to the addition or the deletion of entries in the dial plan. This is illustrated by step 110.

Note that, in general, all participating endpoints or telephones will have a dial plan, which is generally provided in the same syntax. By having a given dial plan (or by initiating a given update), the new dial plan can easily be pushed out to all of the other endpoints. Generally, if a given endpoint (during the configuration) elects to have a dial plan, it will be able to receive the change in the dial plan or the introduction of a new dial plan.

FIG. 3 is a simplified block diagram of an example operation of communication system 10 that involves a semi automatic scenario. Note that certain problems may arise in a fully automatic solution such that a semi automatic solution may be more beneficial. Fully automatic techniques for generating a SIP phone dial plan from a tree-based set of patterns (including overlapping patterns) can result in several problems. For example, computational times may be so lengthy that they are simply prohibitive.

One process that may be attempted by an administrator is to walk backwards in order to match each pattern and to avoid creating empty patterns. Note that the larger the existing patterns, the more an individual (e.g. an administrator) has to walk backwards to summarize them. Therefore, the work required to successfully complete the conversion problem can grow exponentially.

In addition, a fully automatic approach is not necessarily smart enough to discern the difference between (for example) patterns that start with the digit '7' and those that begin with the digit '9.' A number of rules could be in conflict with each other during normal operative conditions. The goal is to provide the smallest, reasonable, most effective dial plan for a given phone.

Hence, to summarize, any number of problems may be encountered during the conversion process, such as: 1) the automation (depending on the algorithm) can result in ambiguous patterns in the phone dial plans (in cases where ambiguity should be avoided); 2) the automation can result in unusually large SIP phone dial plans if the patterns between the two systems match exactly (e.g., the tree-based model might have 7123 and 7124 as patterns, but to optimize this on a memory limited device, 7XXX would be a better candidate pattern. The automated conversion process will result in 7123 and 7124. If carried to the extreme, it is evident that this would result in perhaps a 1000 individual patterns on the phone for the single 7XXX pattern); 3) the algorithm for full automation is (n^2) (e.g. for a large number of patterns the computation time required to perform a complete conversion is unacceptable); and 4) there are contradicting rules that need to be applied during the conversion process. For example, the 911 pattern should not result in a 9XX pattern on the phone. There are not likely to be other values in the 900-999 range of interest. The result should be the exact same pattern on the phone (i.e. 911). However, doing this is at odds with the issue raised in problem '2' highlighted directly above. Hence, there is no way for a fully automatic system to necessarily know the difference. Because of the problems 1-4 outlined above, manual intervention is generally preferred in some instances.

Turning to an operation of an example embodiment associated with a semi automatic process, which is represented by FIG. 3, consider a case where (again) an individual seeks to move from a standard IP phone system to a SIP-based IP phone system. This is illustrated by step 200. (It should be noted again that while a Call Manager implementation is described throughout this example for purposes of illustration and teaching, any suitable communications platform could readily benefit from the expansive teachings of the present invitation in both fully automatic and semi automatic scenarios. The Call Manager has only been offered for purposes of example and, accordingly should be construed as such.)

In this example, if the pattern is only digits, then the starting point for a simple algorithm is to evaluate the first digit and to designate one significant digit in the system (e.g. '7'), whereby the other digits are wildcards. This is illustrated by step 202. Hence, if an individual entered 7, 1, 2, 3 the automated portion of the semi automatic would suggest the pattern 7XXX is the correct pattern to be placed on the phone. This is illustrated by step 204. This would cover 1000 patterns, which is significantly less when compared to a fully automatic approach.

This simple step would reduce the possible combinations and address some of the computational issues highlighted above. In step 206, the user-interface would allow an administrator to decide whether or not to include 7XXX in the phone dial plan. If the administrator opts not to accept the suggestion, the present invention can maintain (e.g. in the new communications platform, in a database, or in telephone 42, etc.) that information, which is illustrated by step 208. The reason for this is to produce some record of these transactions.

In alternative scenarios, the administrator can simply manually input any element into the dial plan and, further, override any suggestion made by the system. This is illustrated by step 210. For example, in the case of an input of 823, the system would suggest 8XX. However, the administrator may determine that he would only like the combination 823 to trigger the phone. Hence, 823 could be manually keyed into the dial plan and the suggestion of 8XX could be discarded and placed onto a record (e.g. a list) that reflects this decision.

To extend this scenario even further, consider the case of ambiguous patterns. In an example that relates to the pattern 71234, the pattern 7XXXX may be suggested. If the pattern 7223 is provided, then 7XXXX and 7XXX would be ambiguous. However, 71XXX and 72XX are not ambiguous. Hence, two significant digits are being used to address this condition. When an administrator encounters this situation, the system would note or flag this condition and illustrate (communicate) the overlap problem to an administrator. This could be done using a single pop-up screen. Now the administrator can choose to implement two significant digits. The system can then respond by regenerating the suggested patterns. Now the suggested options would be 71XXX and 72XX. Hence, the semi automatic scenario involves a prompting step that allows an end user to confirm the suggested pattern. This may be performed continuously as patterns are suggested. The administrator can choose the ambiguous pattern and continue, or decide to pursue other options as outlined above.

At step 212, the administrator can continue to receive update information or to implement new dial plans where appropriate. The administrator would again have discretion as to which patterns would be accepted and placed in the system.

Note that for purposes of further explanation, the following discussion is provided, which addresses a distinct embodiment of the present invention associated with the Call Manager platform. It should be recognized that while this discussion focuses on Call Manager, any other suitable communications platform may readily be used and accommodated by the present invention. Hence, the subsequent should not be construed to limit any possible implementation of the present invention.

Call Manager's core routing engine is centralized. Directory numbers, numeric aliases, and gateway number ranges are stored in a centralized search structure using the same core data element: a pattern. A pattern generally consists of a set of wildcards akin to those that appear in UNIX regular expressions. For instance, the pattern 1XXX contains four wildcards. The wildcard "1" encompasses exactly the digit "1" while the wildcard "X" encompasses any single digit in the range "0" to "9." Thus, pattern 1XXX can match any string of dialed digits in the range 1000 to 1999.

Importantly, Call Manager also supports a bracket notation that allows a particular wildcard to match specific non-contiguous digits. The wildcard [137] matches the single digit "1," the single digit "3" or the single digit "7." [137] XXX would then match any number in the ranges 1000-1999/3000-3999/7000-7999. Call Manager's digit analysis is fundamentally about comparing strings of dialed digits against a store of patterns. For any given digit string. Call Manager's digit analysis looks for the pattern that comprises the closest match. When the closest match is found, Call Manager then selects the call destination information associated with the pattern.

This information can consist of commands to modify the calling and called party information and ultimately determines which device Call Manager ultimately offers a call to. The digit analysis logic, thus, performs two main functions: 1) digit collection, which is a function that indicates when enough digits have been provided for Call Manager to make a routing determination; and 2) route selection, which determines which device should take the call when all digits have been collection. SCCP phones and other devices therefore need only pass digits transparently to Call Manager in order for the business of establishing a call to be done. Protocols such as SIP (and MGCP, from which the concept of digit maps originates) split these responsibilities. Sending all digits one at a time to a centralized entity does remove responsibility for the endpoints, but it also puts additional load on the centralized component, which must handle additional messages per each digit that is dialed. If the digit collection responsibility is farmed to the endpoints, then the endpoint handles the digit-by-digit stuff and delivers a call establishment message to the call agent only upon determining that enough digits have been provided for the call agent to select a route.

For the endpoint to be able to understand whether enough digits have been collected, the endpoint needs data. Call Manager's pattern store contains this data. Strictly speaking, this data could be provided in raw form to the endpoint to use to perform digit collection. However, this data store is very large. For instance, in a system that contains 5,000 phones, there are likely to be at least 5,000 separate patterns (e.g. 1000, 1001, 1005, 1007, 1010, 1011 . . . 2225 . . . etc.). Note that, while these patterns look just like numbers, in Call Manager terms they are not. They are patterns that happen to match one and only one sequence of dialed digits. If a person were to take these patterns and the pattern logic used for the digit collection algorithm and move it to the endpoints, the system would work.

These patterns are stored individually, since these patterns each select different called destinations. Nevertheless, different patterns are not needed if all an endpoint is attempting to do is determine when enough digits have been provided to make a routing determination. Therefore, an aspect of the present invention is about dial plan summarization or dial plan compression. The idea is to come up with a smaller set of patterns that can accurately match all of the individual patterns stored server side. For instance, if patterns 1000, 1001, 1002, . . . 1099 all existed, instead of storing 100 individual patterns, the endpoint could store the single pattern 10XX and, for digit collection purposes, and have exactly the same external behavior as if all 100 individual patterns were stored. Hence, the fully automatic summarization can perform a non-lossy dial plan compression, while the semi-automatic summarization can perform a lossy compression of the original information.

Thus, with the semi-automatic algorithm, the administration system is maintaining a set of dial maps to be downloaded to phones when they initialize. When an administrator adds a new pattern (directory number, etc., they are all patterns), the system compares the specific pattern entered against the existing dial map. If one of the entries encompasses the added pattern, then the system functions properly. However, if no existing dial map entry encompasses the pattern, then the administrative system proposes a new dial map entry consisting of the initial wildcard in the added pattern, followed by a number of Xes sufficient to consume the remaining digits.

In the fully automatic algorithm, the administrative system is performing a non-lossy compression of the data. Patterns 1000, 1001, and 1002, because of the compression, would turn into 100[012]. The resultant digit set would match only those patterns that had been configured and no patterns that had not been configured.

Note that the benefits of the enhanced dial plan conversion feature can be achieved using standard telephone routing tables. Hence, even in cases where traditional telephone setups are employed, the system would still be capable of implementing an effective dial plan conversion.

It is important to note that the stages and steps in FIGS. 2 through 3 illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. For example, an administrator may easily implement a suitable combination of fully and semi automatic protocols based on his particular needs.

In addition, a number of these operations have been described as being executed concurrently with, or in parallel to, one or more additional operations. However, the timing of these operations may be altered considerably. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing enhanced, automated conversion functions.

Although the present invention has been described in detail with reference to particular embodiments, it should be understood that various other changes, substitutions, and alterations may be made hereto without departing from the spirit and scope of the present invention. For example, the illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of the LAN could easily be replaced by a virtual private network (VPN.), a metropolitan area network (MAN), a wide area network (WAN), a wireless LAN (WLAN), or any other element that facilitates data propagation for endpoints 12a-d. Using analogous reasoning, the routers and switches illustrated by FIG. 1 may be supplanted by bridges, gateways, or any other suitable devices that are conducive to network communications.

In addition, usage of the term 'administrator' herein includes any individual or end user that seeks to perform or to facilitate the conversion process. In certain instances, the administrator could even be a computer or any other electronic component that executes tasks associated with the conversion process. Additionally, reference to an XML format (in the context of the dial plan) has only been offered for purposes of teaching. Other formats can be accommodated by the conversion process as presented herein.

Note also that, although it is implied in the preceding description and highlighted through this document, different dial plans can be built for different endpoints from the same call control. This reflects a portion of the overall construction of the present invention and, thus, is being emphasized once again to overwhelmingly demonstrate its significance.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method to be executed in a session initiation protocol (SIP) environment, comprising:
   initiating a conversion process that involves a change from a first communications platform to a second communications platform;
   initiating a conversion script to provide a dial plan corresponding to the second communications platform;
   receiving a plurality of sequences of digits;
   generating, by a processor, one or more patterns from the sequences of digits, the patterns used to collect digits in the second communications platform and generated by:

evaluating, by the processor, a first digit of two or more sequences of digits;

designating, by the processor, the first digit as a significant digit of a pattern; and including, by the processor, one or more wildcard digits into the pattern to summarize the two or more sequences of digits, the pattern allowing for selection of call destination information for a string of dialed digits that match the pattern; and facilitating loading of one or more files associated with the dial plan into one or more endpoints to allow the endpoints to collect digits in the second communications platform, each endpoint comprising an Internet Protocol (IP) phone.

2. The method of claim 1, further comprising:

loading one or more additional files as part of an update to the dial plan.

3. The method of claim 2, further comprising:

receiving the update for the dial plan such that one or more patterns associated with the dial plan are either deleted or added to the dial plan.

4. The method of claim 1, wherein each time a change in digit analysis occurs a new parameter is created, the second communications platform being operable to interoperate with the new parameter.

5. The method of claim 1, wherein one or more of the endpoints are SIP IP telephones.

6. The method of claim 1, further comprising:

manually inputting one or more additional patterns into the dial plan, wherein an administrator is capable of changing the dial plan before one or more of the files are loaded into one or more of the endpoints.

7. The method of claim 1, wherein the first communications platform is a Call Manager, and wherein the second communications platform is SIP-enabled after the conversion has been completed.

8. An apparatus for communicating data in a session initiation protocol (SIP) environment, comprising:

a first communications platform, wherein a conversion process that involves a change from a second communications platform to the first communications platform may be initiated, the first communications platform operable to:

initiate a conversion script to provide a dial plan corresponding to the first communications platform;

receive a plurality of sequences of digits;

generate one or more patterns from the sequences of digits, the patterns used to collect digits in the second communications platform and generated by:

evaluating, by the processor, a first digit of two or more sequences of digits;

designating, by the processor, the first digit as a significant digit of a pattern; and including, by the processor, one or more wildcard digits into the pattern to summarize the two or more sequences of digits, the pattern allowing for selection of call destination information for a string of dialed digits that match the pattern; and facilitate loading of one or more files associated with the dial plan into one or more endpoints to allow the endpoints to collect digits in the first communications platform, each endpoint comprising an Internet Protocol (IP) phone.

9. The apparatus of claim 8, wherein the first communications platform is operable to load one or more additional files as part of an update to the dial plan.

10. The apparatus of claim 9, wherein the first communications platform is operable to receive the update for the dial plan such that one or more patterns associated with the dial plan are either deleted or added to the dial plan.

11. The apparatus of claim 8, wherein each time a change in digit analysis occurs a new parameter is created, the first communications platform being operable to interoperate with the new parameter.

12. The apparatus of claim 8, wherein the first communications platform is operable to load one or more files associated with the dial plan into one or more endpoints that are designated to change to the second communications platform and wherein one or more of the endpoints are SIP IP telephones.

13. The apparatus of claim 8, wherein the first communications platform is operable to manually input one or more additional patterns into the dial plan, and wherein the dial plan can be changed before one or more of the files are loaded into one or more of the endpoints.

14. Software for facilitating a data session in a session initiation protocol (SIP) environment, the software being embodied in a computer readable medium and comprising computer code such that when executed is operable to:

initiate a conversion process that involves a change from a first communications platform to a second communications platform;

initiate a conversion script to provide a dial plan corresponding to the second communications platform;

receive a plurality of sequences of digits;

generate one or more patterns from the sequences of digits, the patterns used to collect digits in the second communications platform and generated by:

evaluating, by the processor, a first digit of two or more sequences of digits;

designating, by the processor, the first digit as a significant digit of a pattern; and including, by the processor, one or more wildcard digits into the pattern to summarize the two or more sequences of digits, the pattern allowing for selection of call destination information for a string of dialed digits that match the pattern; and facilitate loading of one or more files associated with the dial plan into one or more endpoints to allow the endpoints to collect digits in the second communications platform, each endpoint comprising an Internet Protocol (IP) phone.

15. The medium of claim 14, wherein the code is further operable to:

load one or more additional files as part of an update to the dial plan.

16. The medium of claim 14, wherein the code is further operable to:

receive the update for the dial plan such that one or more patterns associated with the dial plan are either deleted or added to the dial plan.

17. The medium of claim 14, wherein each time a change in digit analysis occurs a new parameter is created, the second communications platform being operable to interoperate with the new parameter.

18. The medium of claim 14, wherein the code is further operable to:

receive a manual input of one or more additional patterns for the dial plan, and wherein the dial plan may be changed before one or more of the files are loaded into one or more of the endpoints.

* * * * *